United States Patent [19]

Ando et al.

[11] Patent Number: 5,798,906
[45] Date of Patent: Aug. 25, 1998

[54] CAPACITOR

[75] Inventors: Kazuo Ando; Tomokazu Shohoji; Naoya Watanabe; Minoru Noguchi, all of Wako, Japan

[73] Assignee: Honda Giken Kogyo Kabushiki Kaisha, Tokyo, Japan

[21] Appl. No.: 892,897

[22] Filed: Jul. 15, 1997

[30] Foreign Application Priority Data

| Jul. 17, 1996 | [JP] | Japan | 8-187129 |
| Jul. 17, 1996 | [JP] | Japan | 8-187130 |
| Jul. 31, 1996 | [JP] | Japan | 8-201439 |

[51] Int. Cl.$^6$ .............. H01G 4/228; H05K 5/03; H01M 2/00
[52] U.S. Cl. .............. 361/520; 361/517; 361/519; 361/535; 361/537; 361/538; 361/540; 429/163; 429/164; 429/175; 429/178
[58] Field of Search .............. 361/517–520, 361/535–538, 540; 429/34–35, 163–164, 178–180, 185, 175–176; 29/25.03

[56] References Cited

U.S. PATENT DOCUMENTS

| 3,398,332 | 8/1968 | Logan. |
| 3,439,232 | 4/1969 | Buskirk et al.. |
| 3,548,264 | 12/1970 | Carino et al.. |
| 5,381,301 | 1/1995 | Hudis ................. 361/275.2 |

*Primary Examiner*—Bot L. Ledynh
*Attorney, Agent, or Firm*—Nikaido, Marmelstein, Murray & Oram LLP

[57] ABSTRACT

A capacitor has a bottomed outer casing housing a capacitor element therein, a lid closing the bottomed outer casing and having a pair of insertion holes defined therein, and a pair of electrode terminals mounted on the lid and connected to the extension leads. The capacitor element includes a plurality of current collectors with respective extension leads extending therefrom. Each of the electrode terminals has an insert inserted in one of the insertion holes with an insulator interposed between the insert and the lid, a flange contiguous to an end of the insert and held against a surface of the lid through the insulator, a joint projecting from the flange and connected to the extension lead, and a staked member contiguous to an opposite end of the insert and crimped over an opposite surface of the lid with the insulator interposed between the staked member and the lid. The flange has a plurality of dimples defined in a surface thereof facing the surface of the lid, the surface of the lid having a plurality of dimples defined therein. The insulator has portions pressed into the dimples of the flange and the lid by the flange which is pressed against the surface of the lid by the staked member.

13 Claims, 12 Drawing Sheets

CAPACITOR

BACKGROUND OF THE INVENTION

1. Field of the Invention

The present invention relates to a capacitor having an outer casing which houses a capacitor element therein and a lid which closes the outer casing.

2. Description of the Related Art

There have heretofore been known capacitors comprising a bottomed cylindrical outer casing which houses a capacitor element and an electrolytic solution therein and a lid which closes the bottomed cylindrical outer casing and has electrode terminals connected to the capacitor element. The capacitor element comprises a plurality of electrodes separated by insulating separators and having respective current collectors. Each of the current collectors comprises a thin mesh sheet of aluminum that includes a main body held in intimate contact with the electrode and an extension lead extending from the main body and connected to one of the electrode terminals. The extension lead is integral with the main body and comprises a thin mesh strip of aluminum.

Figure 12:
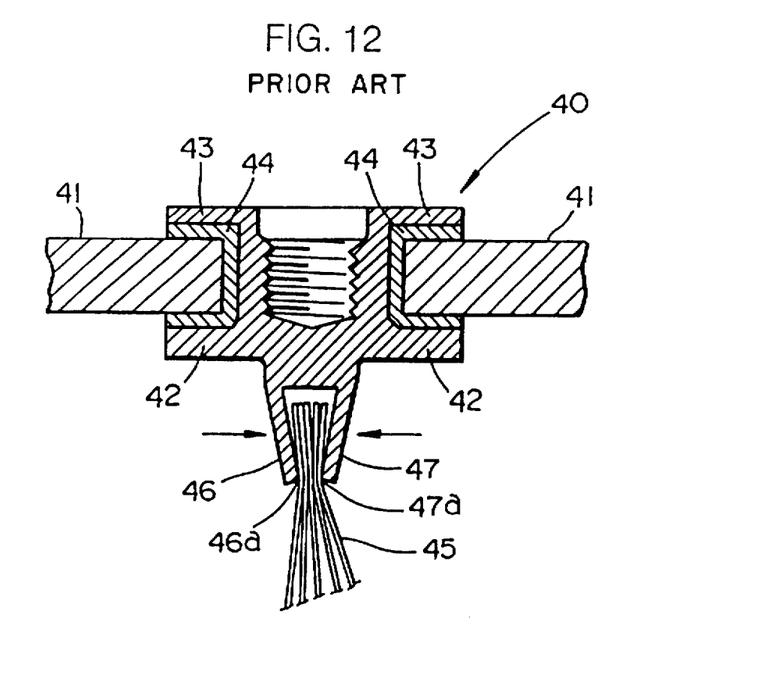
FIG. 12 is an enlarged fragmentary vertical cross-sectional view of an electrode terminal, extension leads, and a lid of a conventional capacitor.

As shown in FIG. 12 of the accompanying drawings, one known electrode terminal 40 is of a cylindrical shape having on a lower end thereof a flange 42 held in intimate contact with a lower surface of a lid 41 and a ring 43 on an upper end thereof staked or crimped over an upper surface of the lid 41. To mount the electrode terminal 40 on the lid 41, the electrode terminal 40 is inserted in the lid 41 with an insulator 44 interposed therebetween before the ring 43 is staked, and then the ring 43 is staked as a flange over the upper surface of the lid 41. The electrode terminal 40 is fixedly mounted on the lid 41 which is sandwiched between the flange 42 and the staked ring 43. Extension leads 45 extending from a capacitor element (not shown) are gripped by and connected to a pair of staked fingers 46, 47 mounted on the lower end of the electrode terminal 40.

If the staked ring 43 is not sufficiently crimped over the upper surface of the lid 41, then when external forces are applied to the electrode terminal 40, the electrode terminal 40 may be forced to move angularly about its own axis. When the electrode terminal 40 is angularly moved, the extension leads 45 connected thereto are twisted or severed by being twisted too much.

The extension leads 45 are connected to the electrode terminal 40 when the fingers 46, 47 are staked in the directions indicated by the arrows in FIG. 12 on the extension leads 45 that are gripped between the fingers 46, 47.

If each of the extension leads 45 comprises a thin mesh strip of aluminum, however, the extension leads 45 have a very small mechanical strength, and hence may easily be cut off at a position where they are pressed by tip ends 46a, 47a of the staked fingers 46, 47. The staked fingers 46, 47 project relatively largely into the outer casing (not shown in FIG. 12) of a capacitor. The projecting staked fingers 46, 47 reduce the space in the outer casing which accommodates the capacitor element, and prevent the capacitor element from increasing in outer profile. Furthermore, the projecting staked fingers 46, 47 tend to contact the capacitor element housed in the outer casing, damaging the capacitor element.

The lid is attached to the outer casing by a known attachment structure described below. Side walls of the outer casing are dented inwardly on their outer surfaces to produce ledges projecting inwardly from the side walls at a position spaced a small distance from the edges of an upper opening of the outer casing. The lid is then inserted into the outer casing through the upper opening until the outer edges of the lower surface of the lid are supported on the ledges of the outer casing. Thereafter, the edges of the upper opening of the outer casing are curled inwardly into abutment against the outer edges of the upper surface of the lid.

The outer edges of the lid are thus vertically clamped securely between the ledges and the curled edges of the upper opening of the outer casing. However, the inner surfaces of the side walls of the outer casing and the outer surfaces of the outer edges of the lid are not sufficiently pressed against each other. Therefore, the outer casing is not highly sealed by the lid.

SUMMARY OF THE INVENTION

It is therefore an object of the present invention to provide a capacitor which has electrode terminals that are prevented from being angularly moved for protection against severance of extension leads and also from being unduly deformed and damaged upon staking.

Another object of the present invention is to provide a capacitor which allows extension leads to be staked on electrode terminals without the danger of being cut off, and which has an outer casing with a relatively large space defined therein for accommodating a capacitor element.

Still another object of the present invention is to provide a capacitor which has an outer casing highly effectively sealed by a lid through a simple staking process.

To achieve the above objects, there is provided in accordance with the present invention a capacitor comprising a bottomed outer casing housing a capacitor element therein, the capacitor element including a plurality of current collectors with respective extension leads extending therefrom, a lid closing the bottomed outer casing and having a pair of insertion holes defined therein, and a pair of electrode terminals mounted on the lid and connected to the extension leads, each of the electrode terminals comprising an insert inserted in one of the insertion holes with an insulator interposed between the insert and the lid, a flange contiguous to an end of the insert and held against a surface of the lid through the insulator, a joint projecting from the flange and connected to the extension lead, and a staked member contiguous to an opposite end of the insert and crimped over an opposite surface of the lid with the insulator interposed between the staked member and the lid, the flange having a plurality of dimples defined in a surface thereof facing the surface of the lid, the surface of the lid having a plurality of dimples defined therein, the insulator having portions pressed into the dimples of the flange and the lid by the flange which is pressed against the surface of the lid by the staked member.

Each of the insertion holes is cylindrical in shape and the insert is cylindrical in shape complementarily to each of the insertion holes. The staked member comprises a hollow member contiguous to the opposite end of the insert and crimped outwardly flatwise over the opposite surface of the lid. The insulator comprises a tubular portion disposed around the insert and a flange held against the flange of the electrode terminal. The tubular portion has a portion spreading with the staked member over the opposite surface of the lid and interposed between the staked member and the opposite surface of the lid.

To assemble the capacitor, the inserts of the electrode terminals with the insulators fitted thereover are inserted into the respective insertion holes. The flanges of the electrode terminals are held against the surface of the lid through the insulators, with the staked members projecting beyond the opposite surface of the lid. The staked members are then crimped over the opposite surface of the lid, fixing the electrode terminals to the lid with the flanges and the staked members. The insulators have flanges that are positioned between the flanges of the electrode terminals and the surface of the like and are partly pressed into the dimples of the flange and the lid. Therefore, the flanges of the insulators are held in gripping engagement with the flanges of the electrode terminals and the lid for thereby preventing the electrode terminals from angularly moving with respect to the lid. The electrode terminals are protected against angular movement under unwanted forces tending to angularly moving the electrode terminals, and hence the extension leads connected to the electrode terminals are prevented from being twisted or broken.

The lid has ridges projecting on the opposite surface thereof and extending along outer edges thereof, the staked members of the electrode terminals having a height not greater than a height of the ridges.

As described above, the electrode terminals are fixed to the lid by the flanges and staked members thereof. At this time, the height of the staked members are equal to or smaller than the height of the ridges. Thereafter, when the joints are crimped to fix the extension leads under pressure to the flanges of the electrode terminals, the ridges are placed on a flat surface of a forming jig or the like. Since the height of the staked members are equal to or smaller than the height of the ridges, the forces applied to crimp the joint are distributed to the ridges, and the electrode terminals are prevented from being unduly deformed or damaged, providing a high sealing capability with respect to the lid.

The insulators are preferably made of fluoroplastic. Therefore, the insulators are preventing from chemically reacting with an electrolytic solution filled in the outer casing when brought into contact therewith. The electrolytic solution is thus prevented from being degraded in use.

The joint has a boss projecting into the bottomed outer casing and a hollow member disposed on a tip end of the boss, the extension leads having respective ends mounted on the hollow member, and an O-ring of metal fitted over the hollow member, the hollow member being crimped outwardly to secure the ends of the extension leads to the flange through the O-ring.

The joints of the electrode terminals are mounted on the ends of the extension leads such that the extension leads are held against the flanges of the electrode terminals. Then, the O-rings are fitted over the joints, which are crimped. The extension leads are now gripped under pressure between the O-rings and the flanges of the electrode terminals, and secured to the joints parallel to the surface of the lid. The hollow members of the joints are crimped outwardly flatwise along the flanges of the electrode terminals. The staked joints project a relatively small distance from the surface of the lid into the outer casing. Consequently, the capacitor element housed in the outer casing is prevented from contacting and being damaged by the joints, and the outer casing provides a relatively large space for housing the capacitor element, which is thus allowed to have a relatively large outer profile.

Inasmuch as the extension leads are staked on the joints in flatwise abutment against the flanges of the electrode terminals through the O-rings, the extension leads are prevented from being cut off when the joints are crimped.

Preferably, each of the extension leads comprises a flat mesh strip of aluminum, and the ends of the extension leads are covered with an aluminum foil. The extension leads, each in the form of a flat mesh strip of aluminum, are sufficiently flexible. The ends of the extension leads which are covered with an aluminum foil have a sufficient degree of mechanical strength.

The bottomed outer casing comprises a rectangular parallelepiped, and is complementary in shape to the opening. The lid has a plurality of grooves defined in respective outer surfaces of outer edges thereof and terminating short of corners of the lid, the bottomed outer case having side walls dented inwardly on outer surfaces thereof around the opening into the grooves.

Because the grooves are defined in the respective outer surfaces of the outer edges of the lid, the outer casing is securely closed by the lid by inserting the lid into the opening of the outer casing and then denting the side walls on their outer surfaces inwardly into the grooves. When the side walls of the outer casing are dented on their outer surfaces inwardly into the grooves, the corners of the outer casing are pulled along the respective corners of the lid, so that the outer casing is closely held against the lid at their corners. Therefore, simply by denting the side walls of the outer casing inwardly into the grooves, the outer casing is closed and sealed by the lid without having to staking the corners of the outer casing.

The side walls of the outer casing do not need to be dented at their corners, but only the side walls of the outer casing are required to be dented partly on their outer surfaces corresponding to the grooves in the outer surfaces of the outer edges of the lid. The side walls of the outer casing can easily be dented inwardly into the grooves in a single pressing operation effected on those outer surfaces of the side walls.

The lid has a pair of recesses defined in a surface thereof along confronting two of the outer edges thereof, the bottomed outer casing having inturned lips bent from upper edges of the side walls thereof around the opening over the surface of the lid along the outer edges of the lid, the inturned lips including regions pressed into the recesses.

When the capacitor is in use after an electrolytic solution is introduced into and sealed in the outer casing closed by the lid, the interior space of the outer casing may undergo a pressure buildup which tends to force the side walls of the outer casing outwardly out of contact with the lid. With the above structure of the present invention, after the side walls of the outer casing are dented inwardly into the grooves, the upper edges of the side walls are bent inwardly to form the inturned lips over the surface of the lid, and the regions of the inturned lips are pressed into the recesses defined in the surface of the lip. The inturned lips and the pressed regions are effective to prevent the outer casing from being forced outwardly out of contact with the lid, so that the outer casing remains closed highly reliably. The recesses defined in the surface of the lip should preferably be positioned at locations where stresses due to the internal pressure buildup concentrate, for thereby efficiently preventing the outer casing from being unduly deformed.

Preferably, the inturned lips are welded to the surface of the lid. The recesses may have respective sharply pointed teeth on respective bottoms thereof, with the regions being held in contact with the sharply pointed teeth, and the regions and the sharply pointed teeth being welded to each other by resistance welding. Alternatively, the inturned lips may have respective edges welded to the surface of the lid by laser beam welding. With the inturned lips being welded to the lid, the outer casing and the lid are integrally joined to each other, so that the outer casing is reliably closed and sealed by the lid.

5

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
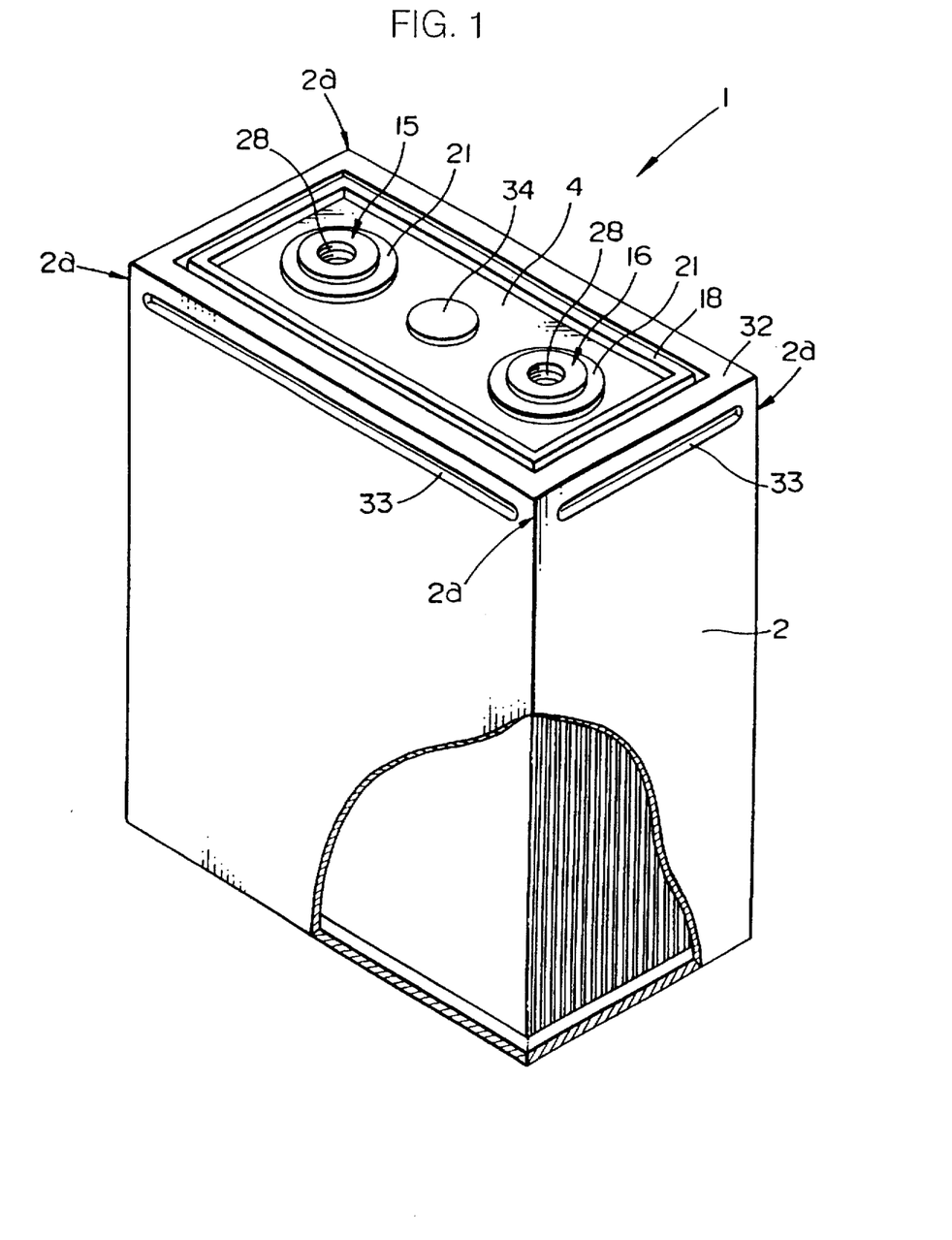
FIG. 1 is a perspective view, partly broken away, of a capacitor according to an embodiment of the present invention.
Figure 2:
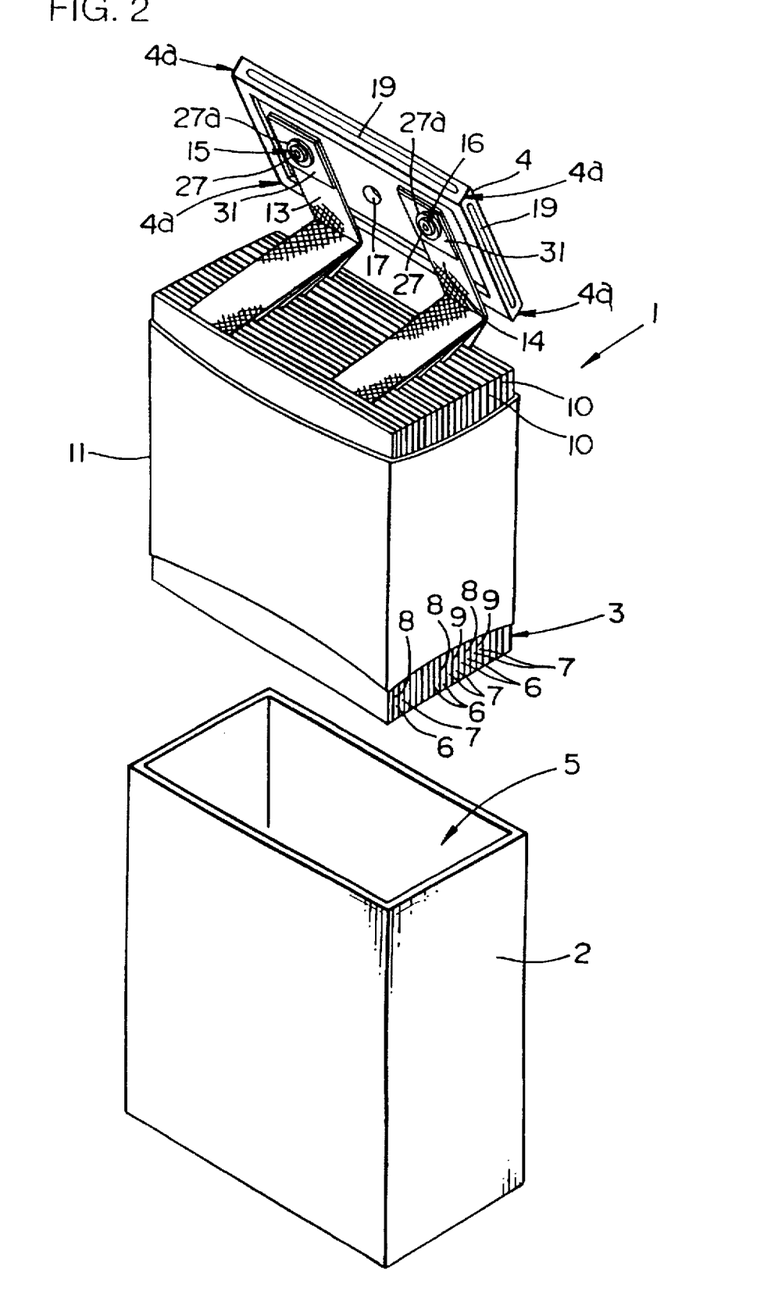
FIG. 2 is an exploded perspective view of the capacitor shown in FIG. 1.

As shown in FIGS. 1 and 2, a capacitor according to an embodiment of the present invention generally comprises an outer case 2, a capacitor element 3 housed in the outer casing 2, and a lid 4 closing the outer casing 2.

Figure 9A:
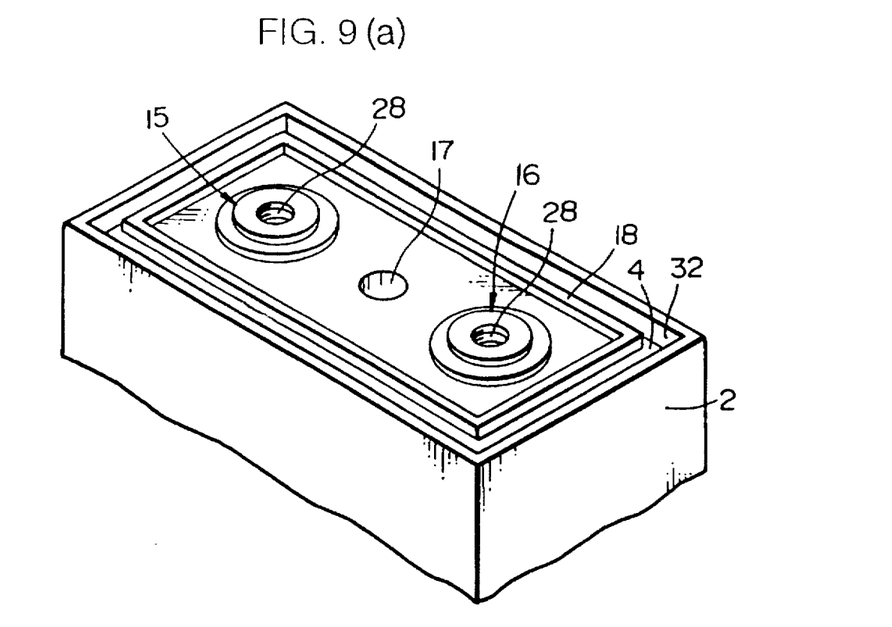
FIGS. 9(a) and 9(b) are fragmentary perspective views showing the manner in which an outer casing of the capacitor shown in FIG. 1 is closed by the lid.
Figure 9B:
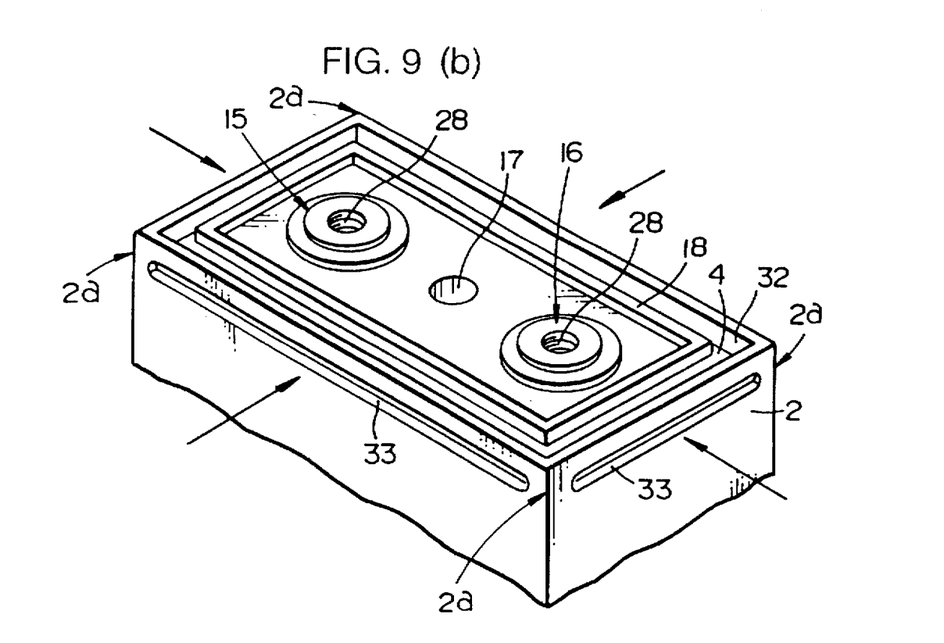

The outer casing 2 is in the form of a bottomed rectangular parallelepiped and has an elongate rectangular opening 5 defined in an upper end thereof which receives the lid 4. The outer case 2 houses an electrolytic solution as well as the capacitor element 3. As described later on, the outer case 2 has inturned lips 32 (see FIGS. 1 and 9(a) and (b)) extending along the upper edges of the outer casing 2 around the opening 5 and folded over an upper surface of the lid 4.

6

As shown in FIG. 2, the capacitor element 3 comprises a plurality of rectangular anode electrodes 6, a plurality of rectangular cathode electrodes 7 identical in shape to the anode electrodes 6, a plurality of anode current collectors 8 held in intimate contact with the respective anode electrodes 6, a plurality of cathode current collectors 9 held in intimate contact with the respective cathode electrodes 7, and a plurality of separators 10 in the form of fluoroplastic sheets disposed between the electrodes 6, 7 and at opposite ends of the capacitor element 3. These electrodes 6, 7, the current collectors 8, 9, and the separators 10 are held together in a laminated structure by a covering tube 11.

Figure 3:
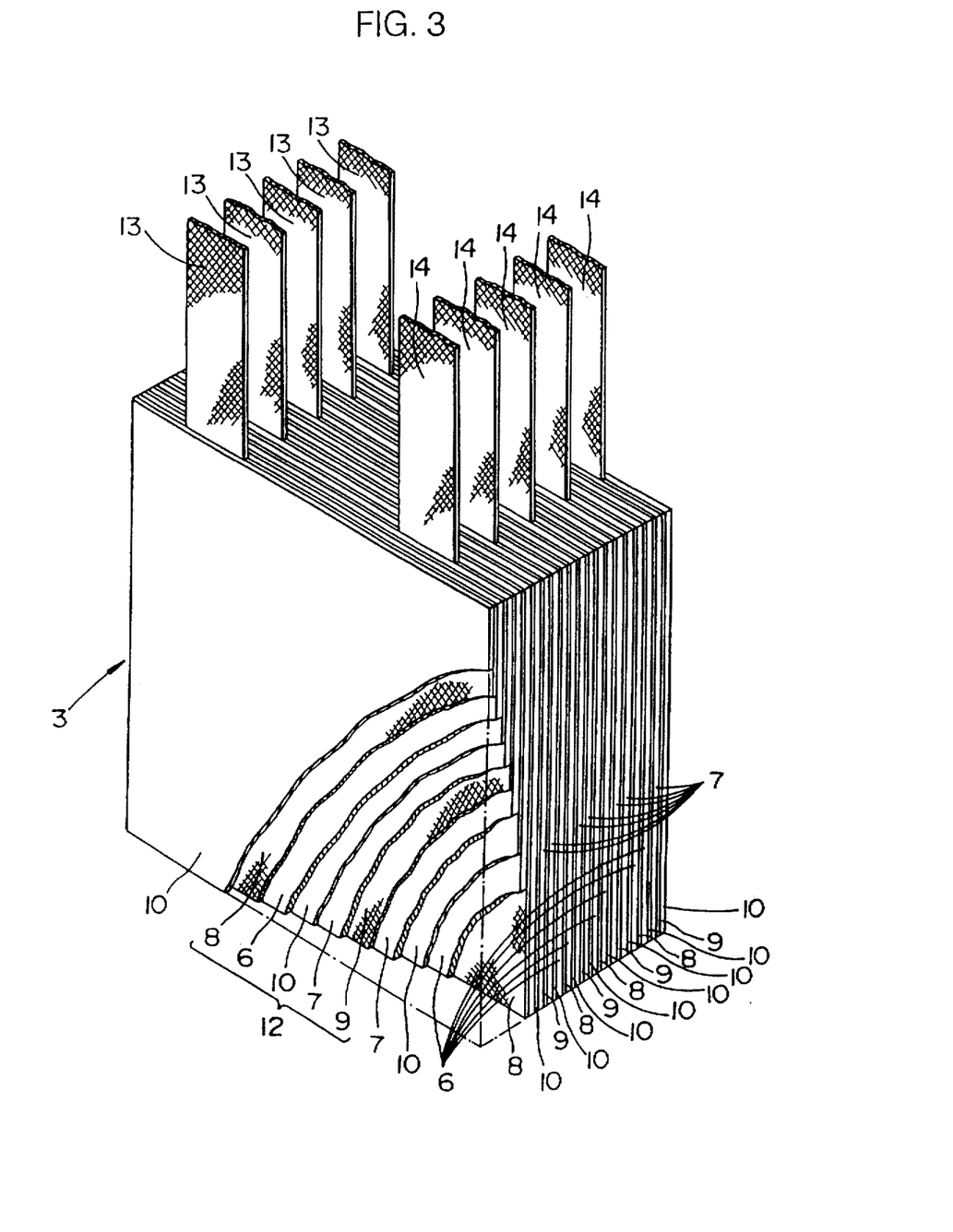
FIG. 3 is a perspective view, partly broken away, of a capacitor element of the capacitor shown in FIG. 1.

As shown in FIG. 3, each of the electrodes 6, 7 is made of a thin sheet of activated carbon paste. Each of the current collectors 8, 9 comprises a thin mesh sheet of aluminum. Each of the anode electrodes 6 and an adjacent one of the cathode electrodes 7 are positioned in confronting relation to each other across one of the separators 10 interposed therebetween, with the anode electrode 6 being associated with one of the anode current collector 8 and the cathode electrode 7 being associated with one of the cathode current collector 9, jointly making up a basic cell 12. Two adjacent basic cells 12 have like electrodes 6 (7) superposed on each other with a current collectors 8 (9) interposed therebetween so as to be shared by those electrodes 6 (7). Since the current collectors 8 (9) comprise thin mesh sheets of aluminum, they are impregnated with the activated carbon paste from the electrodes 6, 7 and hence are held in intimate contact therewith. Furthermore, the current collectors 8 (9) are low in material cost and weight.

Each of the anode current collectors 8 has a strip-shaped anode extension lead 13 extending upwardly from an upper edge on one side thereof, and each of the cathode current collectors 9 has a strip-shaped cathode extension lead 14 extending upwardly from an upper edge on an opposite side thereof.

As shown in FIGS. 1 and 2, the lid 4 comprises a flat rectangular block of aluminum, and has a pair of electrode terminals 15, 16 and an inlet port 17 defined therein between the electrode terminals 15, 16 for introducing an electrolytic solution therethrough into the outer casing 2. The anode extension leads 13 of the anode current collectors 8 are connected to the electrode terminal 15, and the cathode extension leads 14 of the cathode current collectors 9 are connected to the electrode terminal 16.

Figure 4:
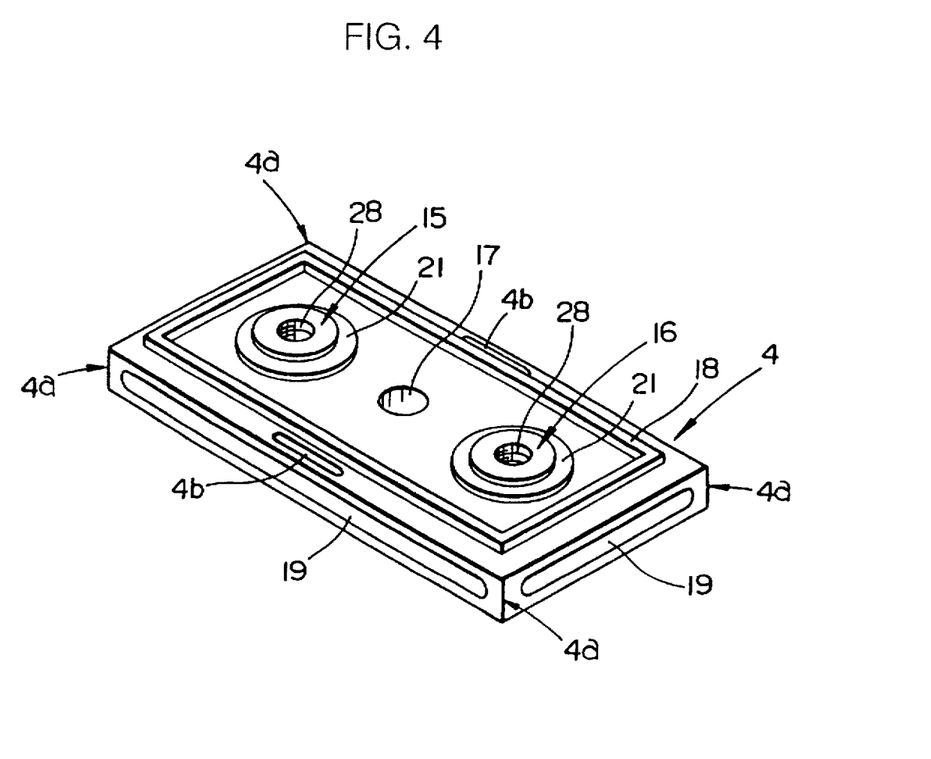
FIG. 4 is a perspective view of a lid of the capacitor shown in FIG. 1.

As shown in FIGS. 2 and 4, the lid 4 has ridges 18 projecting on an upper (outer) surface thereof and extending along outer edges thereof at a position slightly inwardly thereof. The lid 4 also has grooves 19 defined in respective outer surfaces of the outer edges thereof which are held against inner surfaces of side walls of the outer casing 2, the grooves 9 terminating short of corners 4a of the lid 4. As shown in FIG. 4, the lid 4 also has a pair of recesses 4b defined in the upper surface thereof near longitudinal edges thereof just outside of the corresponding ridges 18.

Figure 5:
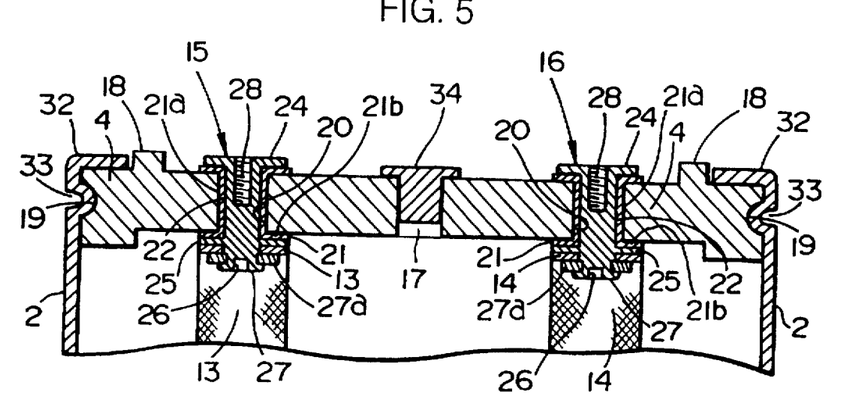
FIG. 5 is a fragmentary vertical cross-sectional view of the capacitor shown in FIG. 1.
Figure 6A:
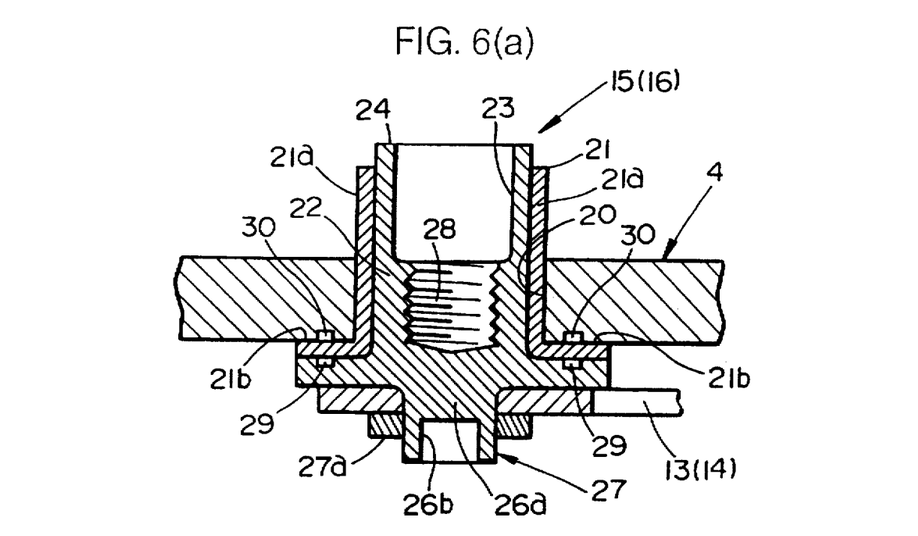
FIG. 6(a) is an enlarged fragmentary vertical cross-sectional view of an electrode terminal, before it is formed, of the capacitor shown in FIG. 1.

As shown in FIG. 5, the electrode terminals 15, 16 extend through respective cylindrical insertion holes 20 defined in the lid 4 with insulators 21 of fluoroplastic interposed between the electrode terminals 15, 16 and the lid 4. The electrode terminals 15, 16 are fixed to the lid 4 with their outer ends staked or crimped over the upper surface of the lid 4. The electrode terminals 15, 16 are connected to the electrodes 6, 7 by the extension leads 13, 14 thereof which are staked or crimped on the inner ends of the electrode terminals 15, 16. More specifically, as shown in FIG. 6(a), each of the electrode terminals 15, 16 comprises a cylindrical insert 22 inserted in one of the insertion holes 20 in the lid 4, a hollow tube 24 extending axially from an end of the insert 22 and having a space 23 defined therein, and a flange 25 mounted on the other end of the insert 22 and extending radially outwardly. Each of the electrode terminals 15, 16 also has a joint 27 comprising a boss 26a contiguous to the flange 25 and projecting coaxially with the insert 22 away from the hollow tube 24 into the outer casing 2, and a hollow tube 26b disposed on the tip end of the boss 26a. The insert 22 has a threaded hole 28 defined therein which is contiguous to the space 23 in the hollow tube 24.

Each of the insulators 21 has a tubular portion 21a disposed around the hollow tube 24 and the insert 22 and a flange 21b held against the flange 25. After the insulator 21 is fitted over the electrode terminal 15 (16), the insulator 21 and the electrode terminal 15 (16) are inserted into the corresponding insertion hole 20 in the lid 4.

Figure 7:
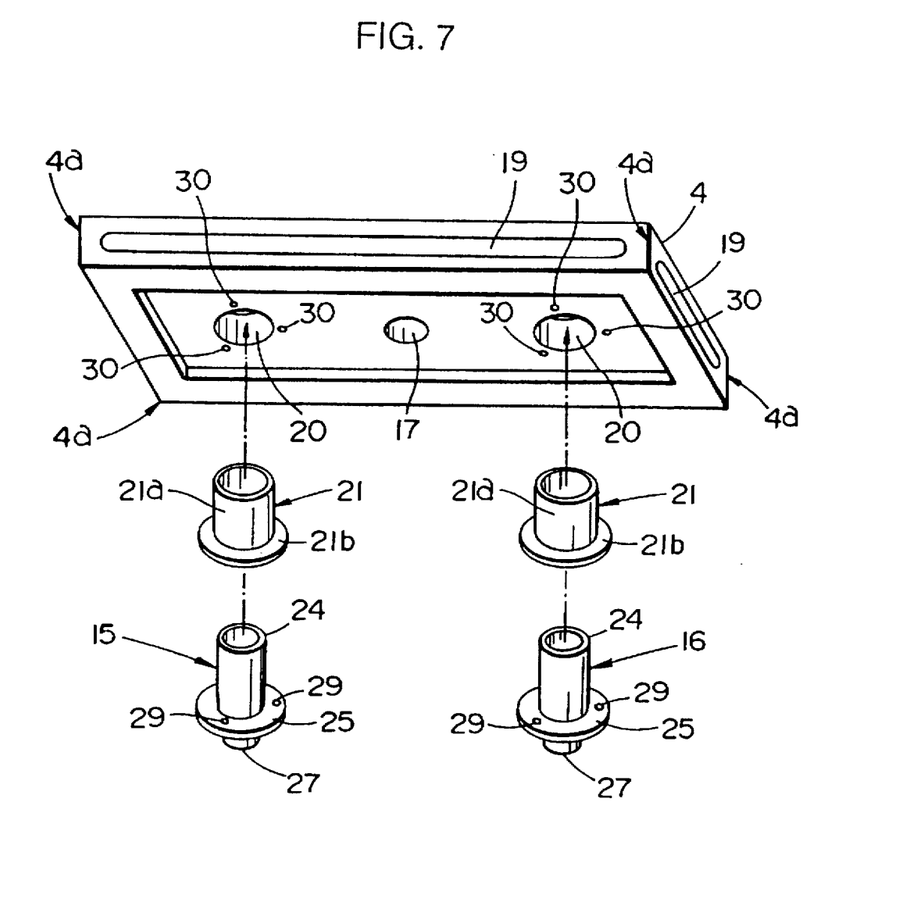
FIG. 7 is an exploded perspective view of the lid and electrode terminals of the capacitor shown in FIG. 1.

AS shown in FIG. 7, the flange 25 of each of the electrode terminals 15, 16 has a plurality of dimples 29 defined in a surface thereof which faces the insert 22. The lid 4 also has a plurality of dimples 30 defined in a lower (inner) surface thereof around each of the insertion holes 20 which is held against the flange 21b.

Figure 6B:
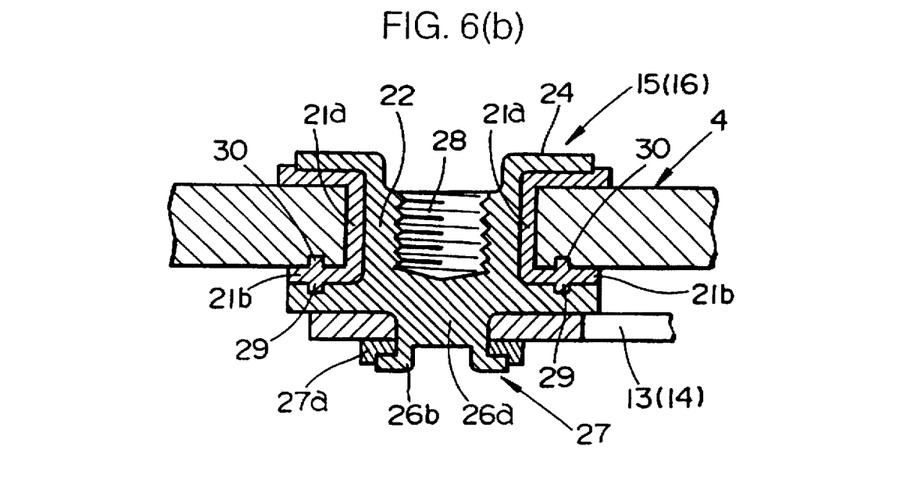
FIG. 6(b) is an enlarged fragmentary vertical cross-sectional view of the electrode terminal, after it is formed, of the capacitor shown in FIG. 1.

The electrode terminals 15, 16 are attached to the lid 4 as follows: As shown in FIG. 6(a), the insert 22 and the hollow tube 24 of each of the electrode terminals 15, 16, and the tubular portion 21a of the insulator 21a which is fitted over the insert 22 and the hollow tube 24 are inserted into one of the insertion holes 20 in the lid 4. At this time, the flange 21b is placed between the lower surface of the lid 4 and the flange 25. Then, as shown in FIG. 6(b), the hollow tube 24 is crimped radially outwardly flatwise over the upper surface of the lid 4, exposing the threaded hole 28. The portion of the tubular portion 21a which projects above the lid 4 is forced radially outwardly by the crimped hollow tube 24 and pressed between the staked hollow tube 24 and the lid 4. When the hollow tube 24 is forcibly crimped radially outwardly, the flange 25 is displaced toward the lid 4, forcing a portion of the flange 21b to be squeezed into the dimples 29 in the flange 25 and the dimples 30 in the lid 4. Consequently, the electrode terminals 15, 16 are firmly mounted on the lid 4 with the insulators 21 interposed between for protection against angular movement on the lid 4. As shown in FIG. 5, the staked hollow tubes 24 of the electrode terminals 15, 16 have a height which is the same as the height of the ridges 18 of the lid 4.

Since the insulators 21 interposed between the electrode terminals 15, 16 and the lid 4 are made of fluoroplastic, they are preventing from chemically reacting with the electrolytic solution filled in the outer casing 2 when brought into contact therewith. The insulators 21 may not be made of fluoroplastic, but the hollow tubes 24, the inserts 22, and the flanges 25 of the electrode terminals 15, 16 may be coated with a layer of fluoroplastic.

As illustrated in FIG. 5, the extension leads 13, 14 are connected to the respective joints 27 of the electrode terminals 15, 16. More specifically, as shown in FIGS. 6(a) and 6(b), the anode extension leads 13 extending from the anode current collectors 8 are put together, and the joint 27 of the anode terminal 25 is inserted through the tip ends of the anode extension leads 13. Thereafter, as shown in FIG. 6(a), an O-ring 27a of metal (aluminum in the illustrated embodiment) is fitted over the hollow tube 26b of the joint 27. Then, as shown in FIG. 6(b), the hollow tube 26b is crimped radially outwardly flatwise over the lower surface of the O-ring 27a, causing the O-ring 27a to fix the anode extension leads 13 to the flange 25. The cathode extension leads 14 extending from the cathode current collectors 9 are similarly connected to the joint 27 of the cathode electrode 16 by crimping the joint 27 over the O-ring 27a.

Figure 8:
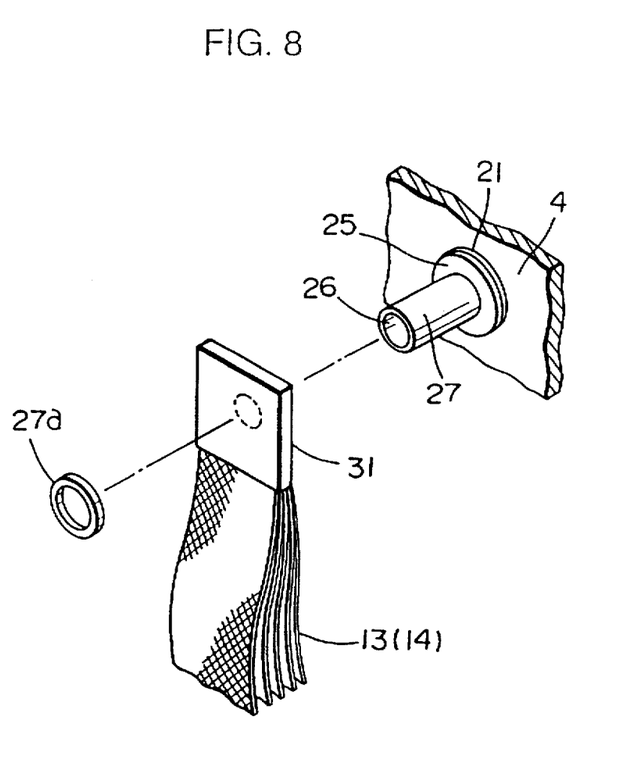
FIG. 8 is an exploded perspective view showing how tip ends of extension leads are connected to an electrode terminal.

As shown in FIG. 8, the anode extension leads 13 or the cathode extension leads 14 are superposed and their tip ends are covered with an aluminum foil 31. Since the extension leads 13, 14 are in the form of thin mesh sheets of aluminum, they are highly flexible but low in mechanical strength. However, the tip ends of the extension leads 13, 14 which are covered with the respective aluminum foils 31 are mechanically strong enough to be securely connected to the joints 27, but the other portions of the extension leads 13, 14 remain sufficiently flexible.

After the O-ring 26a is fitted over the hollow tube 26 of the joint 27, the hollow tube 26 is crimped radially outwardly. Therefore, the anode extension leads 13 or the cathode extension leads 14 are connected to the joints 27 while lying horizontally against the lower surface of the lid 4, and the staked joints 27 project a relatively small distance from the lower surface of the lid 4 into the outer casing 2. Consequently, the capacitor element 3 housed in the outer casing 2 is prevented from contacting and being damaged by the joints 27, and the outer casing 2 provides a relatively large space for housing the capacitor element 3, which is thus allowed to have a relatively large outer profile.

Inasmuch as the height of the staked hollow tubes 24 is the same as the height of the ridges 18, as described above, not only the staked hollow tubes 24 but also the ridges 18 through the flanges 25 can provide a bearing surface for forces that are applied to crimp the joints 27. Thus, the staked hollow tubes 24 are prevented from being damaged by undue forces, but the joints 27 can be crimped to provide a reliable high sealing capability at the electrode terminals 15, 16. The staked hollow tubes 24 should not project beyond the ridges 18, and the height of the staked hollow tubes 24 may be smaller than the height of the ridges 18.

The outer casing 2 is closed by the lid 4 as follows: After the capacitor element 4 is connected to the electrode terminals 15, 16 on the lid 4, the capacitor element 4 is placed into the outer casing 2. Then, as shown in FIG. 9(a), the lid 4 is fitted into the opening 5 of the outer casing 2. The lid 4 is now positioned at a position slightly lower than the upper edges, which project upwardly, of the outer casing 2 around the opening 5. The upper edges will later be crimped inwardly into inturned lips 32. Thereafter, as shown in FIG. 9(b), the side walls of the outer casing 2 are dented inwardly in the directions indicated by the arrows on their outer surfaces 33 which correspond to the grooves 19 of the lid 4, forcing corresponding inner surfaces behind the dented surfaces 33 into the grooves 19. Since the dented surfaces 33 which correspond to the grooves 19 terminate short of the corners 2a of the outer casing 2, a plurality of pressing jigs used to dent the side walls of the outer casing 2 may be positioned out of physical interference with each other, and can be simultaneously operated to form the dented surfaces 33. When the outer surfaces 33 are dented inwardly, the corners 2a are pulled inwardly into close contact with the respective corners 4a of the lid 4, pressing the side walls of the outer casing 2 firmly against the entire outer edges of the lid 4 without gaps therebetween. Consequently, the outer casing 2 is highly securely sealed by the lid 4.

If the grooves 19 were defined all the way in the entire outer edges of the lid 4, it would be necessary to attach the lid 4 to the outer casing 2 in two distinct steps, i.e., by pressing two confronting side walls of the outer casing 2 into the corresponding grooves 19 of the lid 4 and then pressing other two confronting side walls of the outer casing 2 into the other corresponding grooves 19 of the lid 4. At this time, it would be difficult to force the corners 2a of the outer casing 2 neatly into the grooves 19 at the corners 4a of the lid 4 because of conflicting material flows in the corners 2a, but the corners 2a would be liable to swell outwardly, producing gaps between the corners 2a and the grooves 19 at the corners 4a. According to the present invention, however, since the grooves 19 terminate short of the corners 4a, and the dented surfaces 33 terminate short of the corners 2a, the corners 2a can reliably be forced into close contact with the respective corners 4a.

Figure 10:
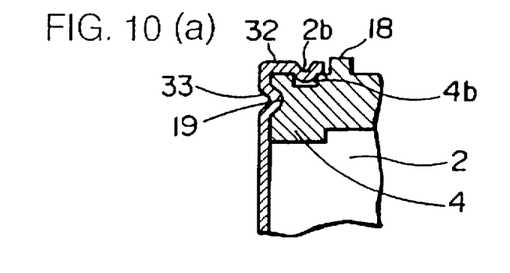
FIG. 10(a) is a fragmentary vertical cross-sectional view of the outer casing closed by the lid.
FIG. 10(b) is a fragmentary vertical cross-sectional view illustrative of a welding process for closing the outer casing with the lid.
FIG. 10(c) is a fragmentary vertical cross-sectional view illustrative of another welding process for closing the outer casing with the lid.
FIG. 10(d) is a fragmentary vertical cross-sectional view illustrative of another process by which the outer casing is closed by the lid.

Thereafter, as shown in FIG. 10(a), the upper edges of the outer casing 2 around the opening 5 are then bent inwardly into inturned lips 32. Confronting two of the inturned lips 32 are pressed at regions 2b into the recesses 4b defined in the upper surface of the lid 4 for thereby securely closing the outer edges of the lid 4. The outer casing 2 and the lid 4 are reliably held together against separation from each other thereby to keep the outer casing 2 firmly closed by the lid 4. Thereafter, an electrolytic solution is introduced through the inlet port 17 in the lid 4 into the outer casing 2. After the electrolytic solution is introduced into the outer casing 2, the inlet port 17 is closed by a closure plug 34 (see FIGS. 1 and 5) for thereby securely sealing the interior space of the outer casing 2.

The outer casing 2 may be more firmly closed by the lid 4 when the inturned lips 32 are welded to the lid 4. Specifically, as shown in FIG. 10(b), each of the recesses 4b has a sharply pointed tooth 4c on its bottom, and the region 2b pressed into the recess 4b is brought into contact with the sharply pointed tooth 4c. Then, electrodes X, Y are held against the upper surface of the corresponding in-turned lip 32 and the outer surface of the outer casing 2, and an electric current is supplied to flow between the electrodes X, Y for thereby resistance-welding the region 2b and the sharply pointed tooth 4c to each other according to an indirect projection welding process, for example.

Alternatively, as shown in FIG. 10(c), each of the recesses 4b may be devoid of the sharply pointed tooth 4c on its bottom, and the edges of the inturned lips 32 may be welded to the upper surface of the lid 4 by a laser beam Z according to a laser beam welding process.

Further alternatively, as shown in FIG. 10(d), the side walls of the outer casing 2 may be dented inwardly on their outer surfaces 2c to produce ledges projecting inwardly from the side walls along the lower surfaces of the outer edges of the lid 4. The lower surfaces of the outer edges of the lid 4 may thus be engaged by and placed on the ledges to close the outer casing 2 more securely with the lid 4.

Figure 11:
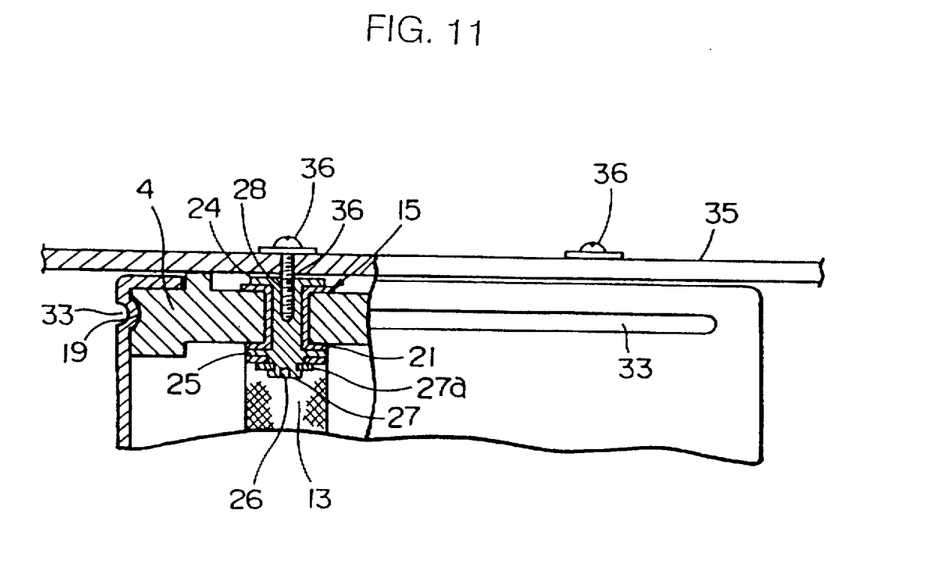
FIG. 11 is an elevational view, partly in cross section, of the capacitor which is mounted on a base plate.

As shown in FIG. 11, the capacitor 1 of the above structure is installed on a base plate 35 by holding the lid 4 against one surface of the base plate 35 and inserting screws 36 through the base plate 35 from the other surface thereof threadedly into the threaded holes 28 in the electrode terminals 15, 16. Since the electrode terminals 15, 16 are prevented from angularly moving about their own axes by the flanges 21b as shown in FIGS. 5 through 7, the screws 36 can reliably be threaded into the threaded holes 28, and the extension leads 13, 14 are prevented from being unduly twisted or cut off.

The opening 5 of the outer casing 2 is of an elongate rectangular shape when viewed in plan. Therefore, stresses due to an internal pressure buildup of the electrolytic solution of the capacitor 1 when in use tend to concentrate on the longitudinal edges of the outer casing 2. This is the reason why the recesses 4b are defined in the upper surface of the lid near longitudinal edges thereof as shown in FIG. 4. If the opening 5 of the outer casing 2 is of a square shape when viewed in plan, then since the stresses tend to be imposed uniformly on the four sides of the outer casing 2, the recesses 4b are defined in the upper surface of the lid near all the four edges thereof for reliably sealing the outer casing 2 with the lid 4.

Although certain preferred embodiments of the present invention have been shown and described in detail, it should be understood that various changes and modifications may be made therein without departing from the scope of the appended claims.

What is claimed is:

1. A capacitor comprising:
   a bottomed outer casing housing a capacitor element therein, said capacitor element including a plurality of current collectors with respective extension leads extending therefrom;
   a lid closing said bottomed outer casing and having a pair of insertion holes defined therein; and
   a pair of electrode terminals mounted on said lid and connected to said extension leads;
   each of said electrode terminals comprising:
      an insert inserted in one of said insertion holes with an insulator interposed between said insert and said lid;
      a flange contiguous to an end of said insert and held against a surface of said lid through said insulator;
      a joint projecting from said flange and connected to said extension leads; and
      a staked member contiguous to an opposite end of said insert and crimped over an opposite surface of said lid with said insulator interposed between said staked member and said lid;
      said flange having a plurality of dimples defined in a surface thereof facing said surface of the lid, said surface of the lid having a plurality of dimples defined therein;
      said insulator having portions pressed into said dimples of said flange and said lid by said flange which is pressed against said surface of said lid by the staked member.

2. A capacitor according to claim 1, wherein each of said insertion holes is cylindrical in shape and said insert is cylindrical in shape complementarily to each of said insertion holes, said staked member comprising a hollow member contiguous to said opposite end of said insert and crimped outwardly flatwise over said opposite surface of the lid, said insulator comprising a tubular portion disposed around said insert and a flange held against said flange of the electrode terminal, said tubular portion having a portion spreading with said staked member over said opposite surface of the lid and interposed between said staked member and said opposite surface of the lid.

3. A capacitor according to claim 1, wherein said lid has ridges projecting on said opposite surface thereof and extending along outer edges thereof, each of said staked members of said electrode terminals having a height not greater than a height of said ridges.

4. A capacitor according to claim 1, wherein said insulator is made of fluoroplastic.

5. A capacitor comprising:
   a bottomed outer casing housing a capacitor element therein, said capacitor element including a plurality of current collectors with respective extension leads extending therefrom;

a lid closing said bottomed outer, casing and having a pair of insertion holes defined therein; and a pair of electrode terminals mounted on said lid and connected to said extension leads;

each of said electrode terminals comprising:
  an insert inserted in one of said insertion holes with an insulator interposed between said insert and said lid;
  a flange contiguous to an end of said insert and held against a surface of said lid through said insulator; and
  a joint projecting from said flange and connected to said extension leads;
  said joint having a boss projecting into said bottomed outer casing and a hollow member disposed on a tip end of said boss, said extension leads having respective ends mounted on said hollow member; and
  an O-ring of metal fitted over said hollow member, said hollow member being crimped outwardly to secure said ends of the extension leads to said flange through said O-ring.

6. A capacitor according to claim 5, wherein each of said extension leads comprises a flat mesh strip of aluminum, said ends of the extension leads being covered with an aluminum foil.

7. A capacitor comprising:
  a bottomed outer casing comprising a rectangular parallelepiped and housing a capacitor element therein, said bottomed outer casing having an opening defined in an end thereof, said capacitor element including a plurality of current collectors with respective extension leads extending therefrom;
  a lid disposed in said opening and closing said bottomed outer casing, said lid having a pair of insertion holes defined therein; and
  a pair of electrode terminals mounted on said lid and connected to said extension leads;
  each of said electrode terminals comprising:
    an insert inserted in one of said insertion holes with an insulator interposed between said insert and said lid;
    a flange contiguous to an end of said insert and held against a surface of said lid through said insulator; and
    a joint projecting from said flange and connected to said extension leads;
  said lid being complementary in shape to said opening, said lid having a plurality of grooves defined in respective outer surfaces of outer edges thereof and terminating short of corners of the lid, said bottomed outer casing having side walls dented inwardly on outer surfaces thereof around said opening into said grooves.

8. A capacitor according to claim 7, wherein said side walls of the bottomed outer casing are dented inwardly on the outer surfaces thereof to produce ledges projecting inwardly from said side walls along lower surfaces of the outer edges of said lid and engaging said lower surfaces of the outer edges of said lid.

9. A capacitor according to claim 7, wherein said lid has a pair of recesses defined in a surface thereof along confronting two of said outer edges thereof, said bottomed outer casing having inturned lips bent from upper edges of the side walls thereof around said opening over said surface of the lid along the outer edges of the lid, said inturned lips including regions pressed into said recesses.

10. A capacitor according to claim 9, wherein said side walls of the bottomed outer casing are dented inwardly on the outer surfaces thereof to produce ledges projecting inwardly from said side walls along lower surfaces of the outer edges of said lid and engaging said lower surfaces of the outer edges of said lid.

11. A capacitor according to claim 9, wherein said inturned lips are welded to said surface of said lid.

12. A capacitor according to claim 11, wherein said recesses have respective sharply pointed teeth on respective bottoms thereof, with said regions being held in contact with said sharply pointed teeth, and said regions and said sharply pointed teeth being welded to each other by resistance welding.

13. A capacitor according to claim 11, wherein said inturned lips have respective edges welded to said surface of said lid by laser beam welding.

* * * * *